(12) United States Patent
Tomioka

(10) Patent No.: US 8,279,533 B2
(45) Date of Patent: Oct. 2, 2012

(54) ZOOM LENS AND IMAGING APPARATUS

(75) Inventor: Ryoko Tomioka, Saitama (JP)

(73) Assignee: Fujifilm Corporation, Tokyo (JP)

( * ) Notice: Subject to any disclaimer, the term of this patent is extended or adjusted under 35 U.S.C. 154(b) by 151 days.

(21) Appl. No.: 12/987,633

(22) Filed: Jan. 10, 2011

(65) Prior Publication Data

US 2011/0170202 A1    Jul. 14, 2011

(30) Foreign Application Priority Data

Jan. 8, 2010  (JP) .................................. 2010-002646

(51) Int. Cl.
*G02B 15/14*    (2006.01)
(52) U.S. Cl. ....................................................... 359/689
(58) Field of Classification Search .................... 359/689
See application file for complete search history.

(56) References Cited

U.S. PATENT DOCUMENTS

| 7,333,275 | B2 | 2/2008 | Sekita |
| 7,460,311 | B2 | 12/2008 | Sekita |
| 7,492,527 | B2 | 2/2009 | Tomioka |
| 2005/0259334 | A1 | 11/2005 | Sekita |
| 2007/0291377 | A1 | 12/2007 | Sekita |
| 2011/0211264 | A1* | 9/2011 | Hayakawa ..................... 359/684 |

FOREIGN PATENT DOCUMENTS

| JP | 2000-267009 | 9/2000 |
| JP | 2005-321744 | 11/2005 |
| JP | 2005-331641 | 12/2005 |
| JP | 2006-139164 | 6/2006 |
| JP | 2008-233499 | 10/2008 |

* cited by examiner

*Primary Examiner* — William Choi
(74) *Attorney, Agent, or Firm* — Young & Thompson

(57) ABSTRACT

A zoom lens includes a negative first lens-group, a positive second lens-group, and a positive third lens-group, sequentially arranged from the object side. The focal length magnification of the zoom lens is changeable by changing a distance between the lens-groups. The first lens-group is composed of a negative first lens, the image side of which is concave, and a positive second lens that is an aspheric plastic lens. The second lens-group is composed of a cemented lens and a meniscus-form fifth lens having a convex surface facing the object side. The cemented lens is composed of a double-convex-form positive third lens and a double-concave-form negative fourth lens. The third lens-group is composed of a positive sixth lens, which is a single lens. Formula (1) about focal length fG2 of the second lens-group and focal length fw of the entire system at wide end is satisfied:

$$1.10 < fG2/fw < 1.33 \qquad (1).$$

10 Claims, 12 Drawing Sheets

EXAMPLE 1

EXAMPLE 1

WIDE

TELE

EXAMPLE 2

EXAMPLE 3

WIDE

TELE

EXAMPLE 4

WIDE

TELE

EXAMPLE 5

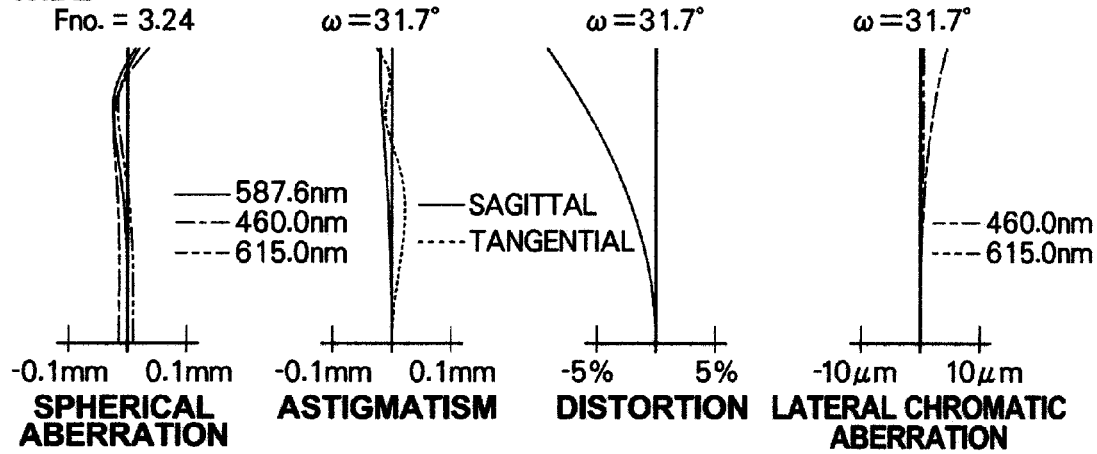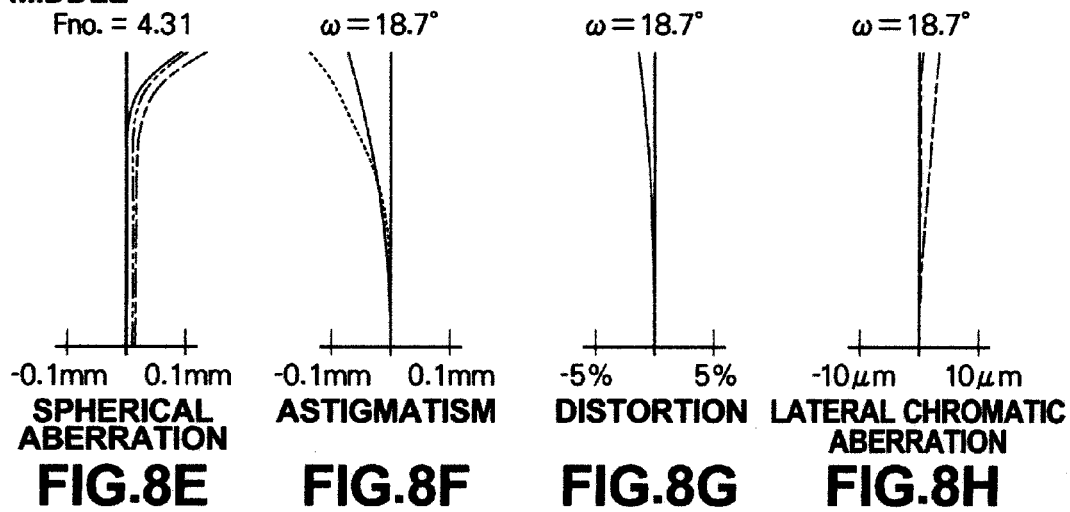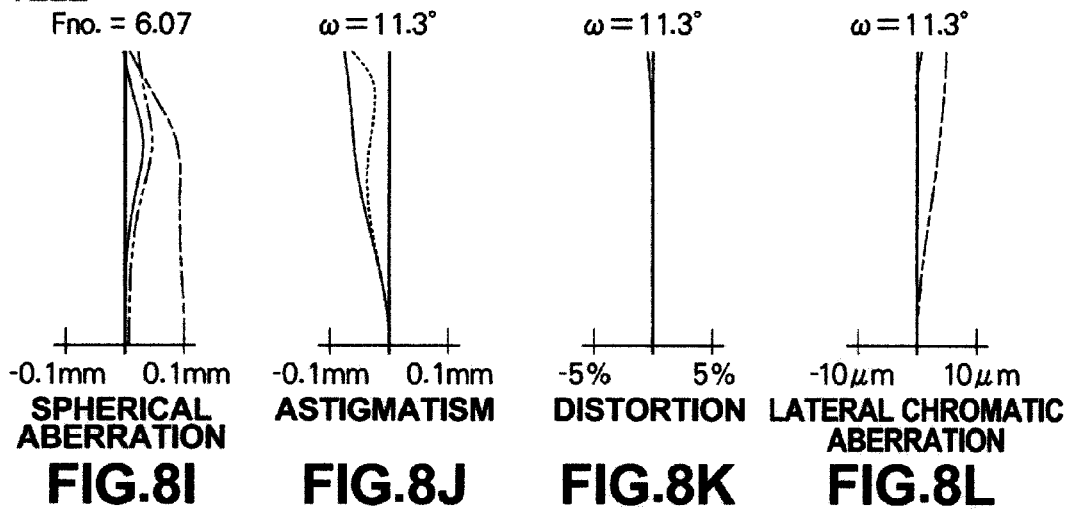

EXAMPLE 2

WIDE

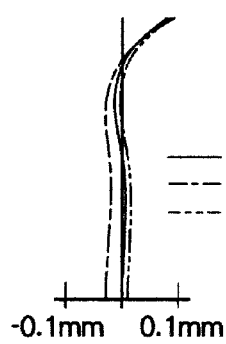

FIG.9A
SPHERICAL ABERRATION
Fno. = 3.17
—— 587.6nm
—·— 460.0nm
----- 615.0nm
-0.1mm  0.1mm

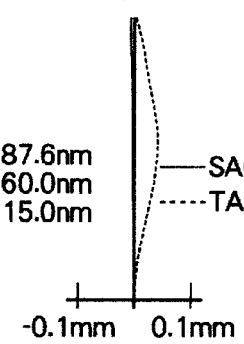

FIG.9B
ASTIGMATISM
ω=32.7°
—— SAGITTAL
······ TANGENTIAL
-0.1mm  0.1mm

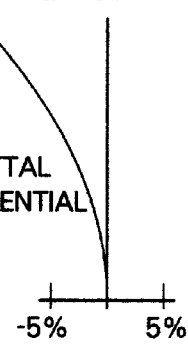

FIG.9C
DISTORTION
ω=32.7°
-5%  5%

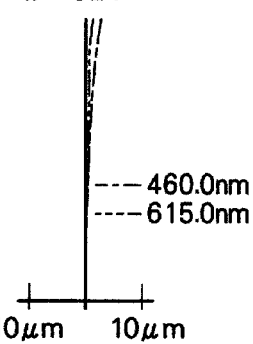

FIG.9D
LATERAL CHROMATIC ABERRATION
ω=32.7°
—·— 460.0nm
----- 615.0nm
-10μm  10μm

MIDDLE

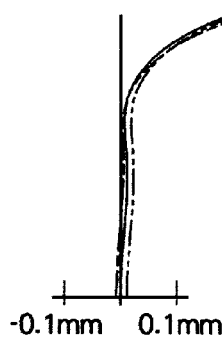

FIG.9E
SPHERICAL ABERRATION
Fno. = 4.25
-0.1mm  0.1mm

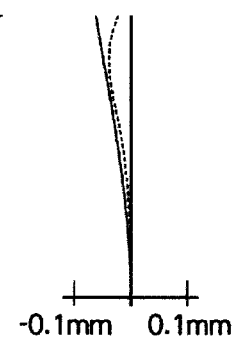

FIG.9F
ASTIGMATISM
ω=19.1°
-0.1mm  0.1mm

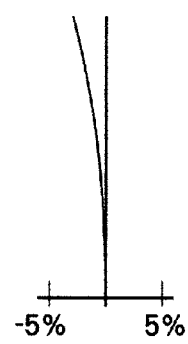

FIG.9G
DISTORTION
ω=19.1°
-5%  5%

FIG.9H
LATERAL CHROMATIC ABERRATION
ω=19.1°
-10μm  10μm

TELE

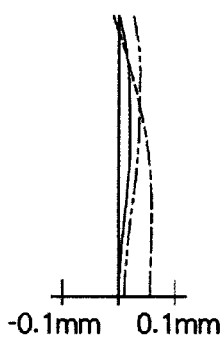

FIG.9I
SPHERICAL ABERRATION
Fno. = 5.95
-0.1mm  0.1mm

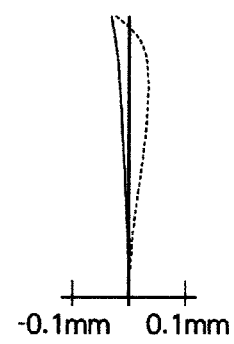

FIG.9J
ASTIGMATISM
ω=11.5°
-0.1mm  0.1mm

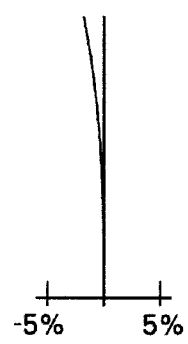

FIG.9K
DISTORTION
ω=11.5°
-5%  5%

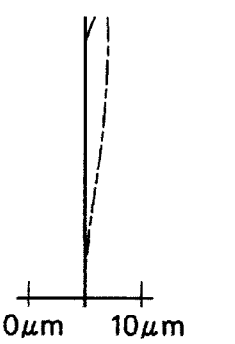

FIG.9L
LATERAL CHROMATIC ABERRATION
ω=11.5°
-10μm  10μm

EXAMPLE 3

WIDE

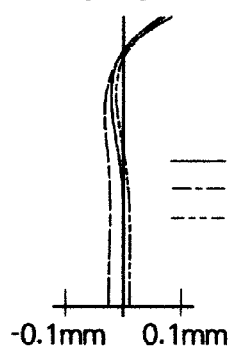

Fno. = 3.21
—— 587.6nm
--- 460.0nm
----- 615.0nm
-0.1mm  0.1mm
SPHERICAL ABERRATION
FIG.10A

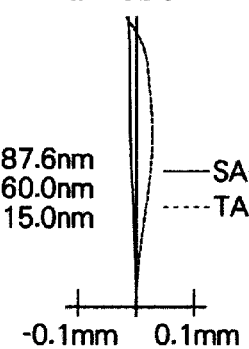

ω=32.6°
—— SAGITTAL
----- TANGENTIAL
-0.1mm  0.1mm
ASTIGMATISM
FIG.10B

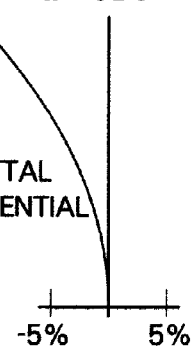

ω=32.6°
-5%  5%
DISTORTION
FIG.10C

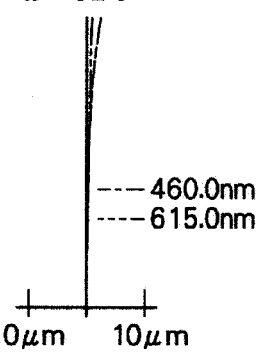

ω=32.6°
--- 460.0nm
----- 615.0nm
-10μm  10μm
LATERAL CHROMATIC ABERRATION
FIG.10D

MIDDLE

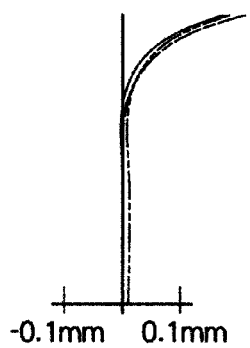

Fno. = 4.28
-0.1mm  0.1mm
SPHERICAL ABERRATION
FIG.10E

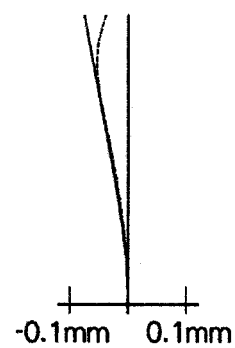

ω=19.1°
-0.1mm  0.1mm
ASTIGMATISM
FIG.10F

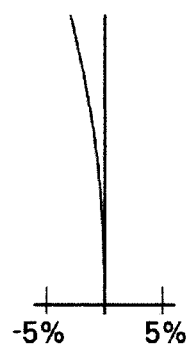

ω=19.1°
-5%  5%
DISTORTION
FIG.10G

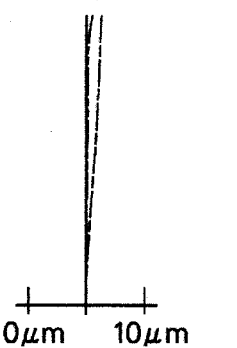

ω=19.1°
-10μm  10μm
LATERAL CHROMATIC ABERRATION
FIG.10H

TELE

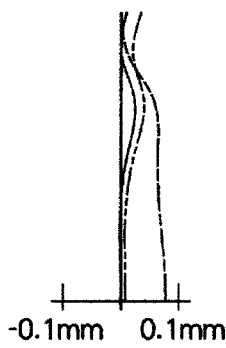

Fno. = 5.97
-0.1mm  0.1mm
SPHERICAL ABERRATION
FIG.10I

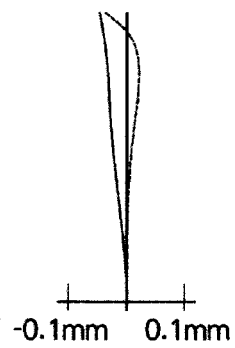

ω=11.5°
-0.1mm  0.1mm
ASTIGMATISM
FIG.10J

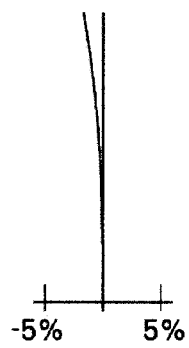

ω=11.5°
-5%  5%
DISTORTION
FIG.10K

ω=11.5°
-10μm  10μm
LATERAL CHROMATIC ABERRATION
FIG.10L

EXAMPLE 4

EXAMPLE 5

WIDE

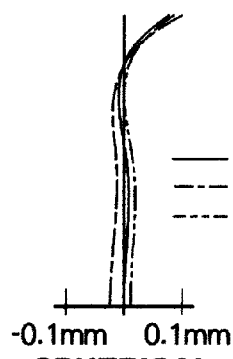

FIG.12A
SPHERICAL ABERRATION
Fno. = 3.15
-0.1mm 0.1mm
— 587.6nm
—·— 460.0nm
---- 615.0nm

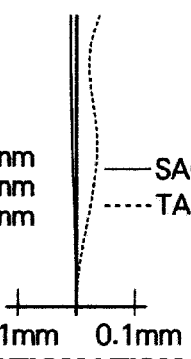

FIG.12B
ASTIGMATISM
$\omega = 32.7°$
-0.1mm 0.1mm
— SAGITTAL
---- TANGENTIAL

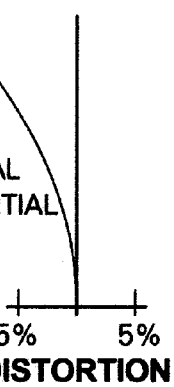

FIG.12C
DISTORTION
$\omega = 32.7°$
-5% 5%

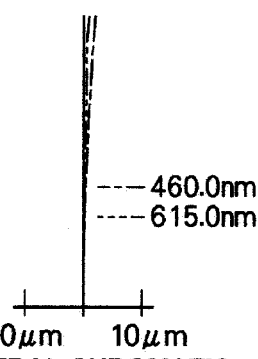

FIG.12D
LATERAL CHROMATIC ABERRATION
$\omega = 32.7°$
-10μm 10μm
—·— 460.0nm
---- 615.0nm

MIDDLE

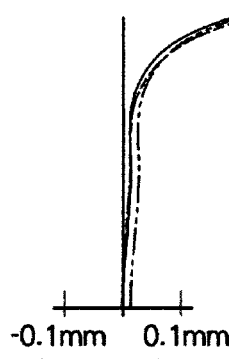

FIG.12E
SPHERICAL ABERRATION
Fno. = 4.23
-0.1mm 0.1mm

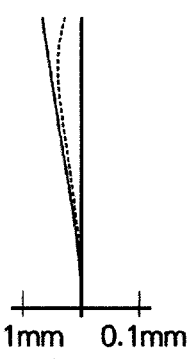

FIG.12F
ASTIGMATISM
$\omega = 19.2°$
-0.1mm 0.1mm

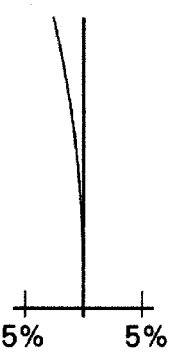

FIG.12G
DISTORTION
$\omega = 19.2°$
-5% 5%

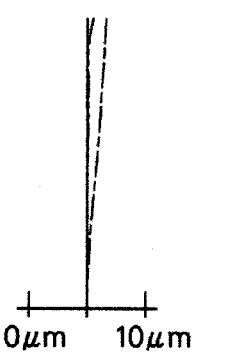

FIG.12H
LATERAL CHROMATIC ABERRATION
$\omega = 19.2°$
-10μm 10μm

TELE

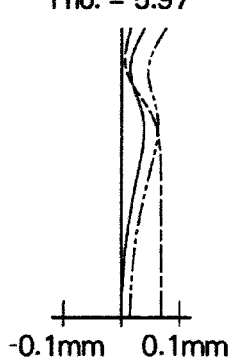

FIG.12I
SPHERICAL ABERRATION
Fno. = 5.97
-0.1mm 0.1mm

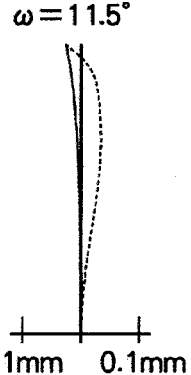

FIG.12J
ASTIGMATISM
$\omega = 11.5°$
-0.1mm 0.1mm

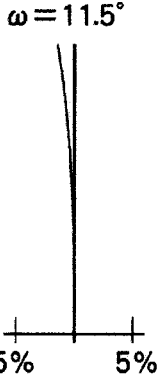

FIG.12K
DISTORTION
$\omega = 11.5°$
-5% 5%

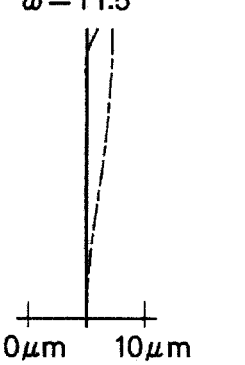

FIG.12L
LATERAL CHROMATIC ABERRATION
$\omega = 11.5°$
-10μm 10μm

ZOOM LENS AND IMAGING APPARATUS

BACKGROUND OF THE INVENTION

1. Field of the Invention

The present invention relates to a zoom lens and an imaging apparatus. In particular, the present invention relates to a zoom lens appropriate for use in a digital camera, a digital video camera, and the like that use imaging devices, such as a CCD (Charge Coupled Device) and a CMOS (Complementary Metal Oxide Semiconductor). Further, the present invention relates to an imaging apparatus including the zoom lens.

2. Description of the Related Art

Conventionally, zoom lenses were used in various cameras. Especially, three-group zoom lenses were widely used, because they are compact and can correct aberrations in an excellent manner. Meanwhile, digital cameras and digital video cameras became rapidly popular in recent years. In the digital cameras and the digital video cameras, it is desirable to reduce the sizes of lenses, and to obtain high quality images with low distortion in a manner similar to lenses of general cameras. Moreover, in the digital cameras and the digital video cameras, it is desirable to reduce the cost for producing lenses. An automatic focusing technique is mainly used in the digital cameras and the digital video cameras, and high-speed focusing is desirable. Therefore, as a method for focusing a zoom lens, an inner focus method and a rear focus method are often used. The inner focus method and the rear focus method can reduce the weight of the lens, and the lens is easily drivable, because the lens is located close to the body of a camera. In such focusing methods, three-group lenses are more appropriate than two-group lenses. Conventionally, three-group zoom lenses that are small and have zoom ratios of approximately three times were disclosed, for example, in Japanese Unexamined Patent Publication No. 2005-321744 (Patent Document 1), Japanese Unexamined Patent Publication No. 2005-331641 (Patent Document 2), Japanese Unexamined Patent Publication No. 2006-139164 (Patent Document 3), U.S. Pat. No. 7,492,527 (Patent Document 4), Japanese Unexamined Patent Publication No. 2008-233499 (Patent Document 5), and Japanese Unexamined Patent Publication No. 2000-267009 (Patent Document 6).

However, in the zoom lenses of the aforementioned fields, a demand for improving the performance of the zoom lens, a demand for reducing the size of the zoom lens, and a demand for lowering the cost for producing the zoom lens became tougher every year. The zoom lenses disclosed in Patent Documents 1 and 2 have compact structure, in which the size of each lens group in the direction of the optical axis is reduced. However, since Patent Documents 1 and 2 use glass as the material of aspheric lenses, the cost for producing the zoom lens is high, and it is difficult to lower the cost to a desirable level of recent years. The zoom lenses disclosed in Patent Documents 3 through 6 use many plastic lenses. Therefore, they can reduce the cost for producing the lenses and the weight of the lenses. However, the sizes of the zoom lenses of Patent Documents 3 through 6 need to be further reduced to satisfy a demand for small zoom lenses of recent years.

SUMMARY OF THE INVENTION

In view of the foregoing circumstances, it is an object of the present invention to provide a zoom lens that is small and can be produced at a low cost, and that can achieve high optical performance. Further, it is another object of the present invention to provide an imaging apparatus including the zoom lens.

A zoom lens of the present invention is a zoom lens comprising:

a first lens group having negative refractive power;

a second lens group having positive refractive power; and a third lens group having positive refractive power, which are sequentially arranged from the object side of the zoom lens, wherein the focal length magnification of the zoom lens is changeable by changing a distance between the lens groups, and wherein the first lens group is composed of a first lens having negative refractive power, and the image side of which is concave, and a second lens that is an aspheric plastic lens having positive refractive power, and wherein the second lens group is composed of a cemented lens and a fifth lens of meniscus form having a convex surface facing the object side, the cemented lens being composed of a third lens of double-convex form having positive refractive power and a fourth lens of double-concave form having negative refractive power, and wherein the third lens group is composed of a sixth lens having positive refractive power, and which is a single lens, and wherein the following formula (1) is satisfied:

$$1.10 < fG2/fw < 1.33 \quad (1),$$

where $fG2$: the focal length of the second lens group, and $fw$: the focal length of the entire system of the zoom lens at wide end.

In the zoom lens of the present invention, the expression "a first lens having negative refractive power, and the image side of which is concave", the expression "a second lens . . . having positive refractive power", the expression "a third lens of double-convex form having positive refractive power", the expression "a fourth lens of double-concave form having negative refractive power", the expression "a fifth lens of meniscus form having a convex surface facing the object side", and the expression "a sixth lens having positive refractive power . . . " refer to paraxial regions when the lenses are aspheric lenses. Further, the term "single lens" refers to a piece of lens, which is not a cemented lens.

In the zoom lens of the present invention, it is desirable that the following formulas (2) through (8) are satisfied:

$$-2.0 < fG1/fw < -1.5 \quad (2);$$

$$(DG1+DG2+DG3)/fw < 1.3 \quad (3);$$

$$Nd2 \geq 1.6 \quad (4);$$

$$vd2 < 30.0 \quad (5);$$

$$26 < vd1-vd2 < 35 \quad (6);$$

$$(Nd3+Nd4)/2 > 1.80 \quad (7); \text{ and}$$

$$vd3-vd4 > 15.0 \quad (8),$$

where $fG1$: the focal length of the first lens group, $DG1$: distance, on the optical axis of the zoom lens, from the most-object-side surface in the first lens group to the most-image-side surface in the first lens group, $DG2$: distance, on the optical axis of the zoom lens, from the most-object-side surface in the second lens group to the most-image-side surface in the second lens group, and DG3: distance, on the optical axis of the zoom lens, from the most-object-side surface in the third lens group to the most-image-side surface in the third lens group, Nd2: the refractive index of the second lens for d-line,
Nd3: the refractive index of the third lens for d-line,
Nd4: the refractive index of the fourth lens for d-line,
vd1: the Abbe number of the first lens for d-line,
vd2: the Abbe number of the second lens for d-line,
vd3: the Abbe number of the third lens for d-line, and
vd4: the Abbe number of the fourth lens for d-line.

In the embodiment of the present invention, one of the formulas (2) to (8) may be satisfied. Alternatively, at least two of the formulas (2) to (8) in combination may be satisfied It is desirable that the zoom lens of the present invention is structured in such a manner that focusing is performed by moving, in the direction of the optical axis of the zoom lens, only the third lens group.

An imaging apparatus of the present invention includes a zoom lens of the present invention.

According to the present invention, the zoom lens is composed of at least three lens groups, and the power, the form and the like of each lens in the lens groups are appropriately set. Further, an aspheric plastic lens or lenses in the zoom lens are appropriately set. Further, the range of the power of the second lens group is appropriately set to satisfy the formula (1). Therefore, it is possible to provide a zoom lens that can achieve high optical performance while the size of the zoom lens is reduced and the cost for producing the zoom lens is reduced. Further, it is possible to provide an imaging apparatus including the zoom lens.

BRIEF DESCRIPTION OF THE DRAWINGS

FIGS. 8A through 8L are diagrams illustrating aberrations of the zoom lens in Example 1 of the present invention;

FIGS. 9A through 9L are diagrams illustrating aberrations of the zoom lens in Example 2 of the present invention;

FIGS. 10A through 10L are diagrams illustrating aberrations of the zoom lens in Example 3 of the present invention;

FIGS. 12A through 12L are diagrams illustrating aberrations of the zoom lens in Example 5 of the present invention.

DESCRIPTION OF THE PREFERRED EMBODIMENTS

Hereinafter, embodiments of the present invention will be described with reference to drawings. FIGS. 1A, 1B through 5A, 5B are cross-sections illustrating examples of structure of a zoom lens according to the embodiment of the present invention. FIGS. 1A, 1B through FIGS. 5A, 5B correspond to zoom lenses in Examples 1 through 5, which will be described, respectively. The basic structure of the zoom lenses illustrated in FIGS. 1A, 1B through 5A, 5B is similar to each other, and the manner of illustrating the zoom lenses is similar to each other. Therefore, the zoom lens according to the embodiment of the present invention will be described mainly with reference to FIGS. 1A, 1B.

Figure 1A:
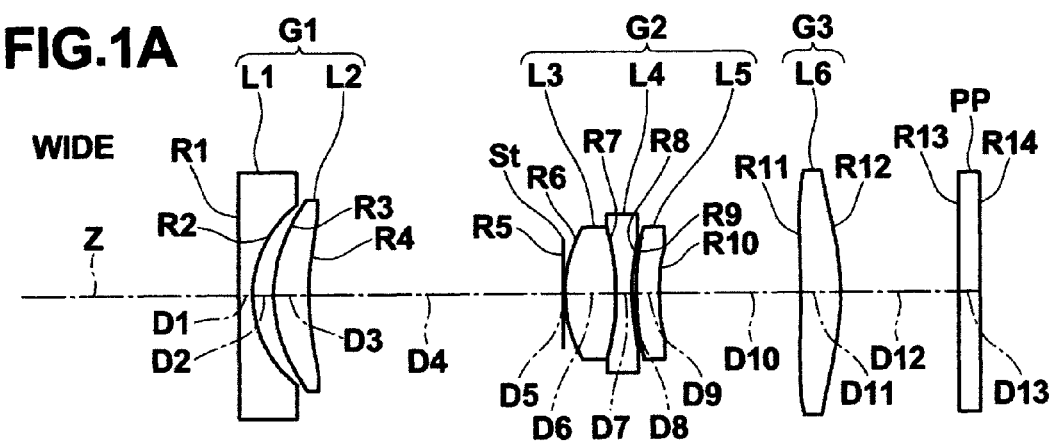
FIG. 1A is a cross-section illustrating the structure of a zoom lens in Example 1 of the present invention at wide end.
Figure 1B:
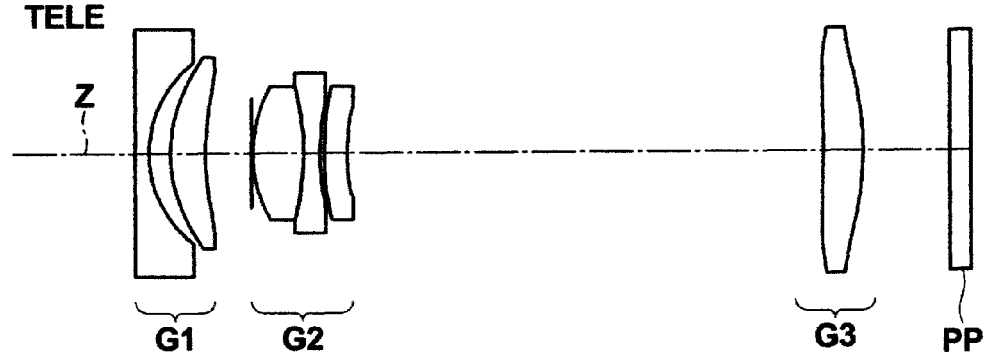
FIG. 1B is a cross-section illustrating the structure of a zoom lens in Example 1 of the present invention at tele end.
Figure 2A:
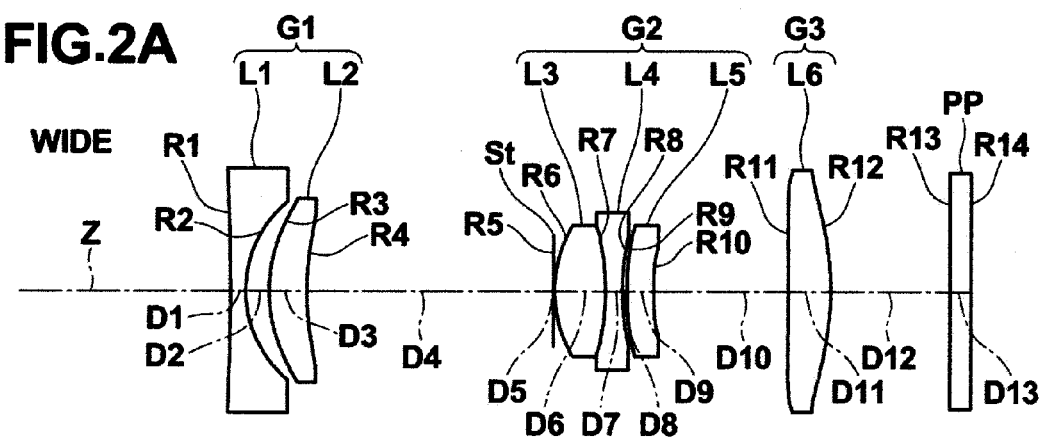
FIG. 2A is a cross-section illustrating the structure of a zoom lens in Example 2 of the present invention at wide end.
Figure 2B:
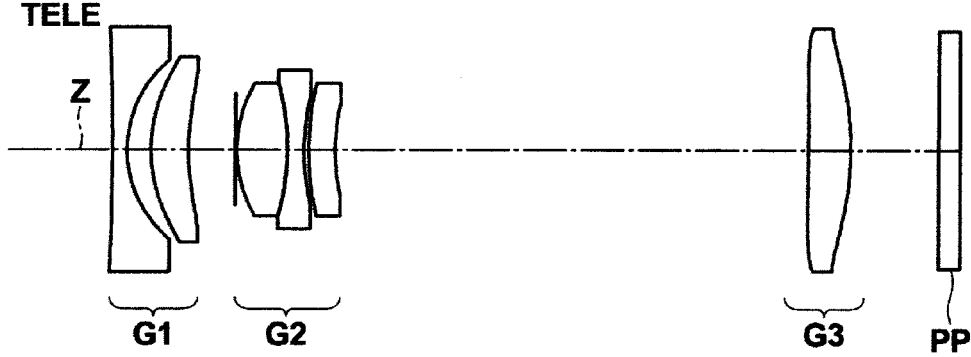
FIG. 2B is a cross-section illustrating the structure of a zoom lens in Example 2 of the present invention at tele end.
Figure 3A:
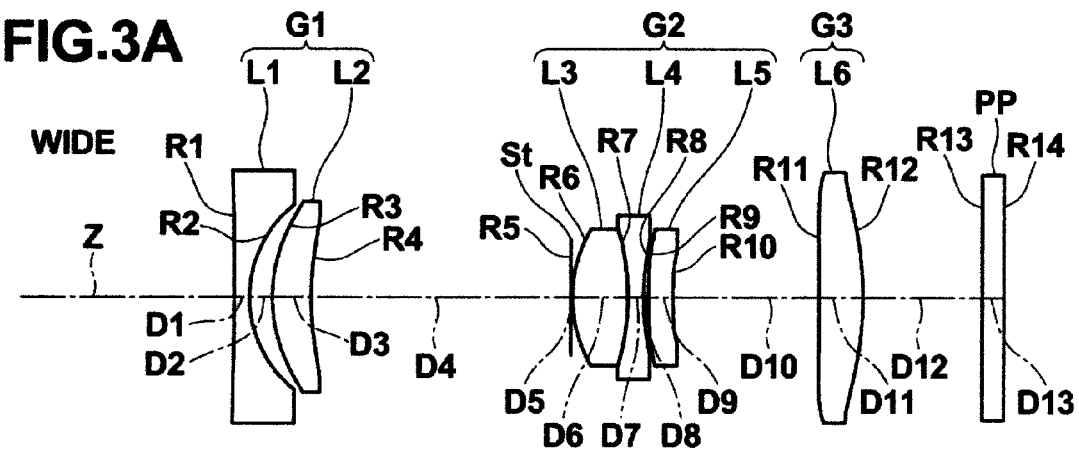
FIG. 3A is a cross-section illustrating the structure of a zoom lens in Example 3 of the present invention at wide end.
Figure 3B:
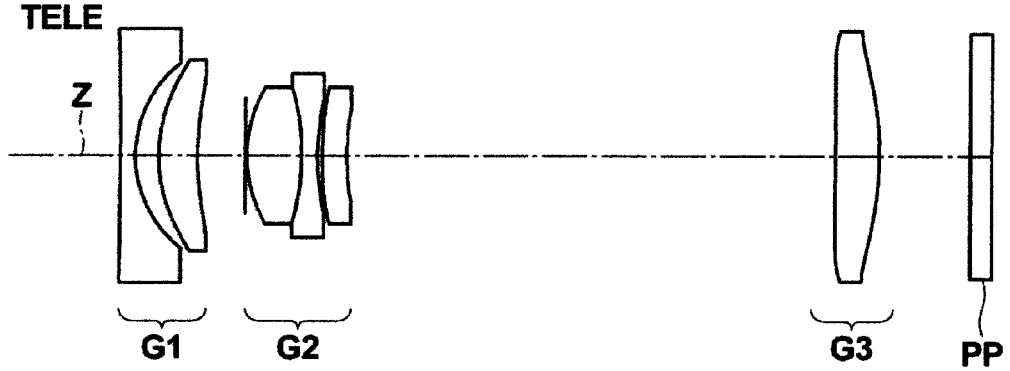
FIG. 3B is a cross-section illustrating the structure of a zoom lens in Example 3 of the present invention at tele end.
Figure 4A:
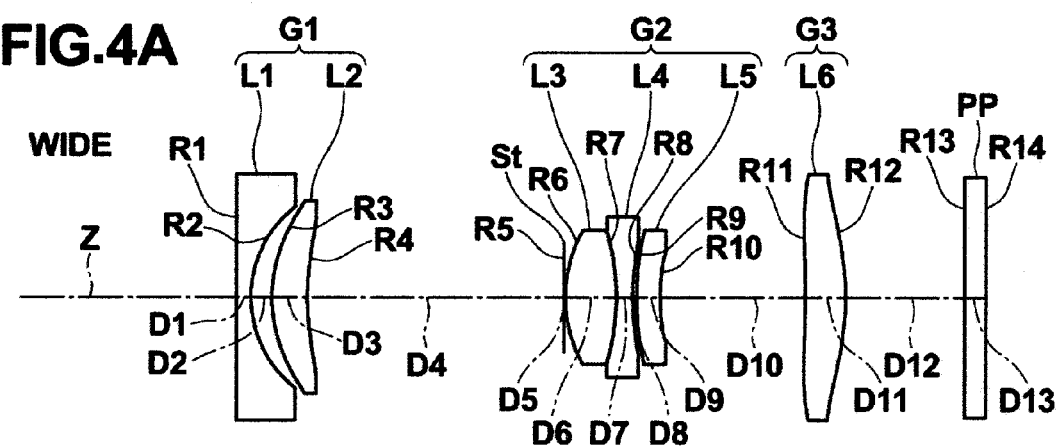
FIG. 4A is a cross-section illustrating the structure of a zoom lens in Example 4 of the present invention at wide end.
Figure 4B:
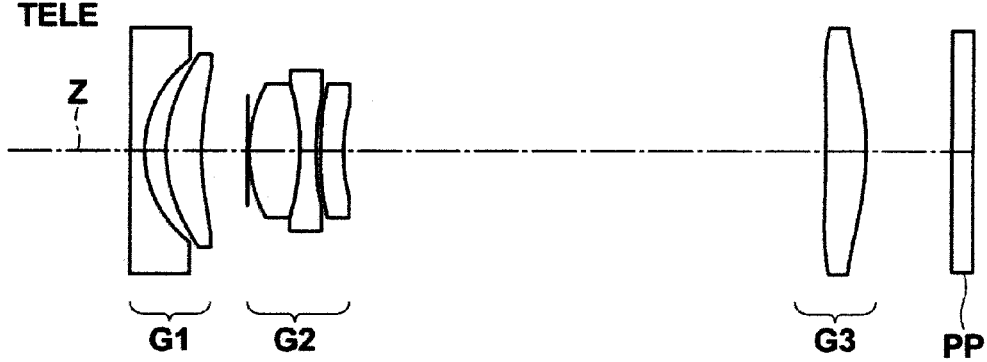
FIG. 4B is a cross-section illustrating the structure of a zoom lens in Example 4 of the present invention at tele end.
Figure 5A:
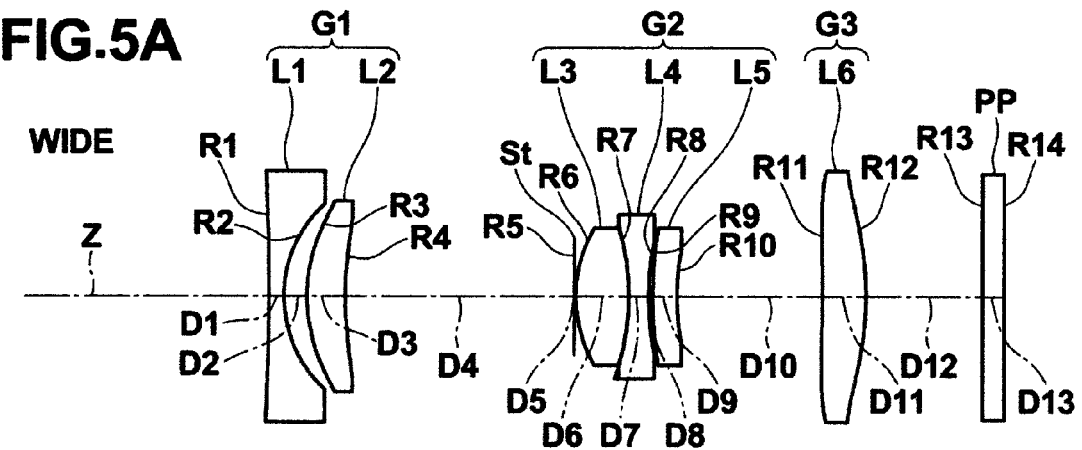
FIG. 5A is a cross-section illustrating the structure of a zoom lens in Example 5 of the present invention at wide end.
Figure 5B:
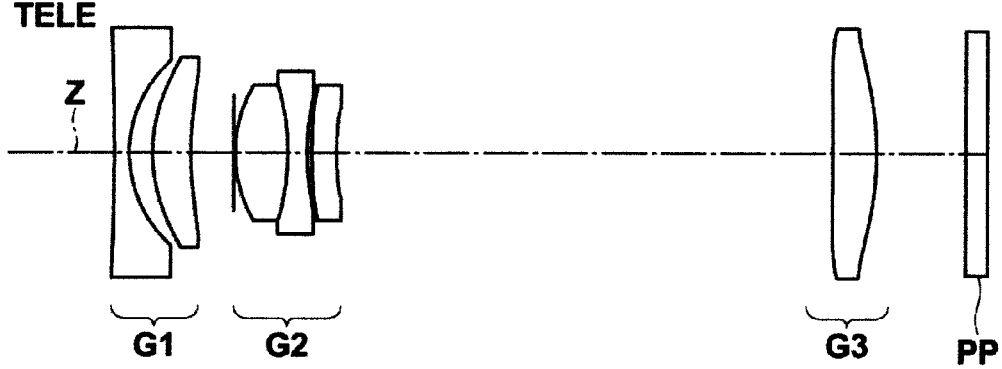
FIG. 5B is a cross-section illustrating the structure of a zoom lens in Example 5 of the present invention at tele end.

In FIGS. 1A, 1B, the left side is the object side, and the right side is the image side. FIG. 1A is a diagram illustrating the arrangement of lenses at wide end, and FIG. 1B is a diagram illustrating the arrangement of lenses at tele end. Further, solid lines between FIGS. 1A and 1B schematically illustrate the movement paths of lens groups when the magnification of the zoom lens is changed.

The zoom lens of the present embodiment has three-group zoom structure, in which first lens group G1 having negative refractive power, second lens group G2 having positive refractive power, and third lens group G3 having positive refractive power are sequentially arranged, along optical axis Z, from the object side of the zoom lens. The magnification of the zoom lens is changed by changing a distance between the lens groups. In the example illustrated in FIGS. 1A, 1B, aperture stop St is arranged on the object side of the second lens group G2. When the magnification of the zoom lens is changed, the aperture stop St moves together with the second lens group G2. In FIGS. 1A and 1B, the aperture stop St does not represent the size nor the form of the aperture stop, but the position of the aperture stop on the optical axis.

In FIGS. 1A, 1B, parallel-flat-plate-shaped optical member PP that is arranged on the image side of the third lens group G3 is also illustrated, considering a case in which the zoom lens is applied to an imaging apparatus. The optical member PP is assumed to be a cover glass, various filters such as a low-pass filter and an infrared ray cut filter, which are appropriately selected based on the use of the imaging apparatus, or the like. In the example illustrated in FIGS. 1A, 1B, an image plane of the zoom lens is arranged at the same position as an image-side surface of the optical member PP.

In FIGS. 1A and 1B, signs Ri (i=1, 2, 3, . . . ) represent curvature radii of surfaces of elements constituting the zoom lens, including lenses, the aperture stop St and the optical member PP. Further, signs Di (i=1, 2, 3, represent distances between surfaces.

The first lens group G1 is composed of first lens and second lens L2. The first lens L1 has negative refractive power, and the image side of the first lens L1 is concave. The second lens L2 is an aspheric plastic lens having positive refractive power. The second lens group G2 is composed of a cemented lens and fifth lens L5, and the cemented lens is composed of third lens L3 and fourth lens L4. The third lens L3 is a double-convex lens having positive refractive power. The fourth lens L4 is a double-concave lens having negative refractive power. The fifth lens L5 is a meniscus lens having a convex surface facing the object side. The third lens group G3 is composed of sixth lens L6, which is a single lens having positive refractive power.

In the zoom lens in the example illustrated in FIGS. 1A, 1B, the first lens L1 is a plano-concave lens, and the second lens L2 is a positive meniscus lens having a convex surface facing the object side. Further, the fifth lens L5 is a negative meniscus lens, and the sixth lens L6 is a positive meniscus lens having a convex surface facing the image side. When the first lens L1 is a plano-concave lens, it is possible to produce the first lens L1 at low cost. Alternatively, the first lens L1 may be a double-concave lens. When the first lens L1 is the double-concave lens, it is possible to increase the negative power of the first lens L1, compared with a plano-concave lens. The double-concave form is advantageous in correction of aberrations.

The outer diameter of the first lens group G1, which is arranged on the most-object side, is larger than the outer diameters of the other lens groups. Therefore, if a plastic lens is used instead of a glass lens in the first lens group G1, the advantageous effect of lowering the cost for production and the weight of the zoom lens is high. However, when a plastic lens is used as the first lens L1, which is located on the most object side, a weak weather resistance factor arises, because plastic has lower weather-resistance characteristics than glass. To solve this problem, it is desirable that a protective member, such as a cover glass, is mounted on the object side of the first lens L1. However, if the protective member is mounted, the cost for production increases. Therefore, it is appropriate to use a plastic lens as the second lens L2 in the first lens group G1.

Since plastic has high flexibility of molding and shaping, it is desirable that plastic is used to form an aspheric lens. In the zoom lens of the present embodiment, the second lens L2 is an aspheric plastic lens. The aspheric surface may be formed on one of the surfaces of the second lens L2. However, if both surfaces of the second lens L2 are aspheric, aberrations are more effectively corrected. The second lens L2, which is a positive lens, suppresses generation of various aberrations by reducing the refractive angle of rays diverged by the first lens L1, which is a negative lens. Therefore, if the second lens L2 is an aspheric lens, it is possible to correct various aberrations in an excellent manner, and to achieve high optical performance.

Figure 6:
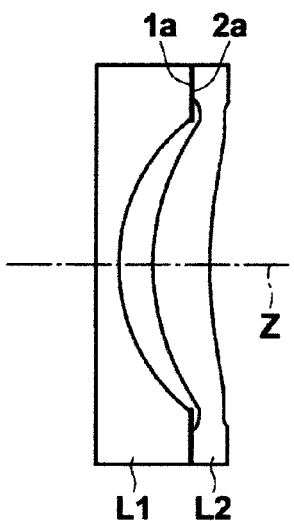
FIG. 6 is a cross-section for explaining the form of the peripheral area of the second lens.

When the second lens L2 is plastic, it is possible to easily form a peripheral area outside the effective diameter of the second lens L2 in such a manner to include a flat plane as illustrated in FIG. 6. Since the image-side surface of the first lens L1 is concave, generally, the peripheral area of the image-side surface of the first lens L1, the peripheral area being outside the effective diameter, includes a flat plane $1a$ as illustrated in FIG. 6. Therefore, if the peripheral area of the object-side surface of the second lens L2, the peripheral area being outside the effective diameter, includes a flat plane $2a$ in such a manner to contact with the flat plane $1a$ of the first lens L1, it is possible to reduce the work of adjusting optical axes of the two lenses constituting the first lens group G1. Further, it is possible to improve the accuracy of constructing the zoom lens.

When the material of the second lens L2 is plastic, it becomes possible to easily form, in desirable form, not only the shape of the lens surface through which rays pass, and which is related to image formation, but the outer shape of the second lens L2, which is related to assembly of the lens. Consequently, it becomes possible to produce the zoom lens at a low cost.

It is not necessary that the entire area of the flat plane $1a$ of the first lens L1 and the entire area of the flat plane $2a$ of the second lens L2 contact with each other. The flat plane $1a$ of the first lens L1 and the flat plane $2a$ of the second lens L2 may partially contact with each other. Further, it is not necessary that the flat plane $1a$ of the first lens L1 and the flat plane $2a$ of the second lens L2 directly contact with each other. For example, a parallel flat member, such as a parallel flat plate or a thinfilm or layer, may be arranged between the flat plane $1a$ and the flat plane $2a$, and the flat plane $1a$ and the flat plane $2a$ may contact with each other through the parallel flat member. The material of the parallel flat member may be, for example, so-called "Mylar". Further, if a member having light cut characteristics is used as the parallel flat member, the parallel flat member can also function to cut ghost light.

In FIG. 6, the flat plane $1a$ of the first lens L1 and the flat plane $2a$ of the second lens L2 are substantially perpendicular to optical axis Z. However, it is not necessary that the flat planes $1a$, $2a$ are set in such a manner. Further, in FIG. 6, the peripheral area of the object-side surface of the first lens L1, the peripheral area outside the effective diameter, and the peripheral area of the image-side surface of the second lens L2, the peripheral area outside the effective diameter, also include flat planes. However, the form of these areas is not limited to the form illustrated in FIG. 6.

In the zoom lens of the present invention, the third lens L3 is a double-convex lens, and the fourth lens L4 is a double-concave lens. Accordingly, the third lens L3 and the fourth lens L4 have strong positive power and strong negative power, respectively. That is advantageous to correction of aberrations, and can contribute to reduction in the number of lenses.

Since the third lens L3 and the fourth lens L4 are cemented together, chromatic aberrations are corrected in an excellent manner. Further, relative eccentricity between the third lens L3 and the fourth lens L4 is reduced, and fluctuation in spherical aberrations is suppressed. Therefore, high optical performance is realized at low cost. Further, since the third lens L3 and the fourth lens L4 are a cemented lens, an air gap between the third lens L3 and the fourth lens L4 is 0. Therefore, the thickness of the optical system in the direction of the optical axis can be reduced, and that contributes to reduction in the size of the optical system.

In addition to the basic lens structure, as described above, the zoom lens of the present embodiment satisfies the following formula (1):

$$1.10 < fG2/fw < 1.33 \qquad (1),$$

where fG2: focal length of the second lens group G2, and
fw: focal length of the entire system at wide end.

The formula (1) relates to the power of the second lens group G2. When the power of the second lens group G2 becomes strong to such a degree that the value of fG2/fw becomes lower than the lower limit defined by the formula (1), a fluctuation in aberrations at the time of changing magnification becomes large. Consequently, it becomes difficult to maintain an excellent optical performance. In contrast, when the power of the second lens group G2 becomes weak to such a degree that the value of fG2/fw exceeds the upper limit defined by the formula (1), a movement amount of the second lens group G2 at the time of changing magnification becomes large, and that is disadvantageous to reduction in the size of the entire optical system.

Further, it is more desirable that the following formula (1-2) is satisfied:

$$1.25 < fG2/fw \leq 1.32 \qquad (1\text{-}2).$$

When the formula (1-2) is satisfied, it becomes possible to realize a more excellent optical performance and to further reduce the size of the optical system.

Further, it is even more desirable that the following formula (1-3) is satisfied:

$$1.3 < fG2/fw \leq 1.32 \tag{1-3}$$

When the formula (1-3) is satisfied, it is possible to realize a more excellent optical performance, compared with the case of satisfying the formula (1-2).

It is desirable that the zoom lens according to the embodiment of the present invention has the following structures. In the embodiment of the present invention, the zoom lens may have one of the structures. Alternatively, the zoom lens may have at least two of the structures in combination.

It is desirable that the zoom lens satisfies the following formula (2):

$$-2.0 < fG1/fw < -1.5 \tag{2}$$

where fG1: the focal length of the first lens group G1, and
fw: the focal length of the entire system at wide end.

The formula (2) relates to the power of the first lens group G1. When the power of the first lens group G1 becomes weak to such a degree that the value of fG1/fw becomes lower than the lower limit defined by the formula (2), a movement amount of the first lens group G1 at the time of changing magnification becomes large, and that is disadvantageous to reduction in the size of the entire optical system. In contrast, when the power of the first lens group G1 becomes strong to such a degree that the value of fG1/fw exceeds the upper limit defined by the formula (2), a fluctuation in aberrations at the time of changing magnification becomes large. Consequently, it becomes difficult to maintain an excellent optical performance.

It is more desirable that the following formula (2-2) is satisfied:

$$-1.8 < fG1/fw < -1.5 \tag{2-2}$$

When the formula (2-2) is satisfied, it is possible to further reduce the size of the optical system.

Further, it is even more desirable that the following formula (2-3) is satisfied:

$$-1.8 < fG1/fw < -1.6 \tag{2-3}$$

When the formula (2-3) is satisfied, it is possible to realize a more excellent optical performance, compared with the case of satisfying the formula (2-2).

It is desirable that the following formula (3) is satisfied:

$$(DG1+DG2+DG3)/fw < 1.3 \tag{3}$$

where

DG1: distance, on the optical axis of the zoom lens, from the most-object-side surface in the first lens group to the most-image-side surface in the first lens group,
DG2: distance, on the optical axis of the zoom lens, from the most-object-side surface in the second lens group to the most-image-side surface in the second lens group,
DG3: distance, on the optical axis of the zoom lens, from the most-object-side surface in the third lens group to the most-image-side surface in the third lens group, and fw: the focal length of the entire system of the zoom lens at wide end.

The formula (3) relates to the thickness (length in the direction of the optical axis) of each lens group. When the lens groups are structured to satisfy the formula (3), it is possible to reduce the thickness of the lens system in the direction of the optical axis when the lens system is collapsible into an imaging apparatus. That can make the lens system compact.

Further, it is desirable that the following formula (3-2) is satisfied:

$$1.1 < (DG1+DG2+DG3)/fw < 1.25 \tag{3-2}$$

When the thickness of each lens group is tried to be reduced to such a degree that the value of (DG1+DG2+DG3)/fw becomes lower than the lower limit defined by the formula (3-2), it becomes necessary to increase the absolute value of the curvature radius of each lens. Consequently, the power of each lens group becomes small. Therefore, the movement amount of each lens group at the time of changing magnification becomes large, and the length of a cam barrel for moving each lens group becomes long. Hence, the length of the entire lens system in a collapsed state becomes long in the direction of the optical axis. When the value of (DG1+DG2+DG3)/fw satisfies the upper limit defined by the formula (3-2), it is possible to make the lens system more compact than the case of satisfying the upper limit defined by the formula (3).

Further, it is desirable that the following formula (4) is satisfied:

$$Nd \geq 1.6 \tag{4}$$

where

Nd2: the refractive index of the second lens L2 for d-line.

The formula (4) relates to the refractive index of the material of the second lens L2. When a material that has a relatively high refractive index satisfying the formula (4) is selected as the material of the second lens L2, it is possible to prevent the absolute value of the curvature radius of the second lens L2 from becoming too small. Further, it is possible to suppress the amount of generated aberrations.

It is desirable that the following formula (5) is satisfied:

$$vd2 < 30.0 \tag{5}$$

where vd2: the Abbe number of the second lens L2 for d-line. The formula (5) relates to the Abbe number of the material of the second lens L2. When a material that has high dispersion satisfying the formula (5) is used as the material of the second lens L2, even if the material of the second lens L2 is plastic, it is possible to easily balance chromatic aberrations. Further, it is possible to correct the chromatic aberrations in an excellent manner.

It is more desirable that the following formula (5-2) is satisfied:

$$vd2 < 28 \tag{5-2}$$

When the formula (5-2) is satisfied, it is possible to correct chromatic aberrations in a more excellent manner.

Further, it is desirable that the following formula (6) is satisfied:

$$26 < vd1 - vd2 < 35 \tag{6}$$

where vd1: the Abbe number of the first lens L1 for d-line, and
vd2: the Abbe number of the second lens L2 for d-line.

The formula (6) relates to the Abbe numbers of the materials of two lenses in the first lens group G1, which are a negative lens and a positive lens. When the materials of the two lenses are selected so as to satisfy the formula (6), even if the material of the second lens L2 is plastic, it is possible to correct chromatic aberrations in an excellent manner.

It is more desirable that the follow formula (6-2) is satisfied:

$$27 < \nu d1 - \nu d2 < 33 \tag{6-2}$$

When the formula (6-2) is satisfied, it is possible to correct chromatic aberrations in a more excellent manner.

It is desirable that the following formula (7) is satisfied:

$$(Nd3+Nd4)/2 > 1.80 \tag{7}$$

where

Nd3: the refractive index of the third lens L3 for d-line, and
Nd4: the refractive index of the fourth lens L4 for d-line.

The formula (7) relates to the refractive indices of lenses constituting a cemented lens in the second lens group G2. When the material of the cemented lens is selected in such a manner to satisfy the formula (7), it is possible to prevent the absolute value of the curvature radius of each surface of the lenses constituting the cemented lens from becoming too small. Further, it is possible to reduce the thickness of the second lens group G2, and that contributes to reduction in the size of the second lens group G2.

Further, it is desirable that the following formula (8) is satisfied:

$$\nu d3 - \nu d4 > 15.0 \tag{8}$$

where vd3: the Abbe number of the third lens L3 for d-line, and
vd4: the Abbe number of the fourth lens L4 for d-line.

The formula (8) relates to the Abbe numbers of the lenses constituting the cemented lens in the second lens group G2. When the materials of the lenses constituting the cemented lens are selected so as to satisfy the formula (8), it is possible to correct lateral chromatic aberrations in an excellent manner.

In the zoom lens of the present invention, a lens or lenses other than the second lens L2 may be an aspheric lens or lenses. For example, if the fifth lens L5 of meniscus form is an aspheric lens, it is possible to correct aberrations in an excellent manner. If the sixth lens L6, which is closest to the image plane, is an aspheric lens, it is possible to improve the telecentric characteristics.

It is desirable that the zoom lens of the present invention is structured in such a manner that focusing is performed by moving, in the direction of the optical axis, only the third lens group G3. Since the third lens group G3 is composed of a single lens, it is possible to suppress a load on a drive mechanism during focusing. Further, it is possible to increase the speed of focusing.

In the zoom lens of the present invention, a lens or a plurality of lenses other than the second lens L2 may be made of plastic to reduce the cost for producing the zoom lens. For example, it is desirable that a lens having an aspheric surface is a plastic lens to reduce the cost for producing the lens.

When focusing is performed by moving only the third lens group G3, if the sixth lens is a plastic lens, it is possible to reduce the weight of the focusing lens. Therefore, it is possible to further increase the speed of focusing. In the zoom lens of the present invention, even if a material that has a relatively low refractive index is used as the material of the fifth lens L5, aberrations are corrected without problems. Therefore, it is desirable that the fifth lens L5 is a plastic lens to reduce the cost for producing the lens.

However, when the zoom lens of the present invention is used in tough conditions, such as an outdoor setting for example, it is desirable that the material of the first lens L1, which is arranged on the most object side, is selected in such a manner that the surface of the lens is not damaged by wind and rain. Further, it is desirable that the material of the first lens L1 is resistant to a change in temperature by direct sunlight, and to chemicals, such as oil and fat, and detergent. In other words, it is desirable to use a material that is highly water-resistant, weather-resistant, acid-resistant, chemical-resistant, and the like. Further, in some cases, it is desirable that the material of the first lens L1 is hard, and not easily breakable nor crackable. When it is essential to satisfy such conditions, it is desirable that the material of the first lens L1 is glass. Alternatively, transparent ceramic may be used as the material of the first lens L1.

When the zoom lens of the present invention is used in tough environmental conditions, it is desirable that a multi-layer coating for protection is applied to the zoom lens. Besides the coating for protection, an anti-reflection coating may be provided to reduce ghost light or the like when the zoom lens is used.

In the example illustrated in FIG. 1, a case in which the optical member PP is arranged between the lens system and an image formation plane (image plane) is illustrated. Instead, various filters, such as a low-pass filter and a filter that cuts a specific wavelength band, or the like may be arranged between lenses. Alternatively, a coat or coating that has a similar function to the various filters may be applied to at least a surface of a lens in the zoom lens.

Generally, the zoom lens is collapsible by moving each lens group along optical axis Z in such a manner to reduce a distance between the lens groups. However, the zoom lens may be collapsed by using a different method. For example, a part of lenses constituting the lens system may be removed from the optical axis Z to be stored.

Figure 7A:
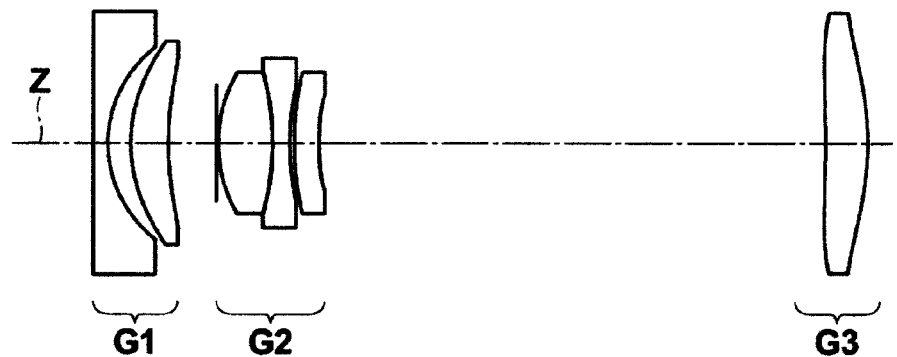
FIGS. 7A through 7C are diagrams for explaining a collapsible mount method.
Figure 7B:
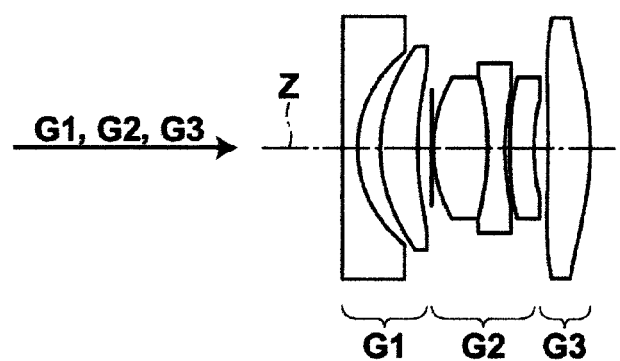

A method for collapsing the zoom lens will be described with reference to FIGS. 7A through 7C. FIG. 7A is a diagram illustrating an example of arrangement of lens groups during photography (imaging). FIG. 7B is a diagram illustrating an example of arrangement of the lens groups when the zoom lens is collapsed by using a general method. In the method illustrated in FIG. 7B, the first lens group G1 through the third lens group G3 are moved in the direction along optical axis Z, as indicated by arrow G1, G2, G3, when the zoom lens is collapsed.

Figure 7C:
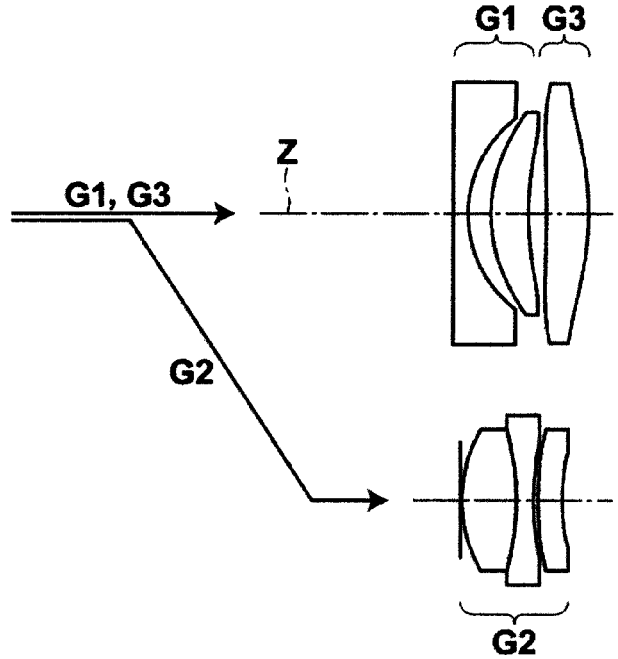
Figures 11A, 11B, 11C, 11D:
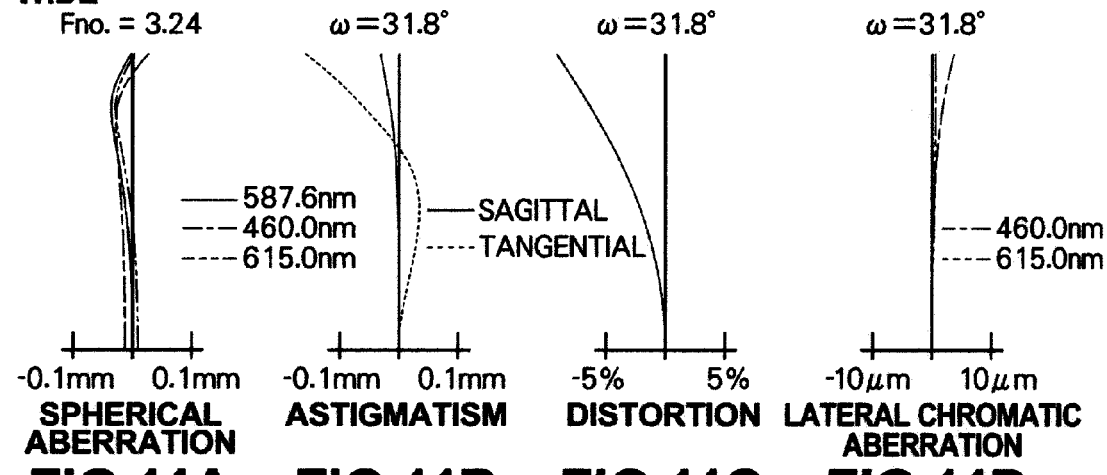
FIGS. 11A through 11L are diagrams illustrating aberrations of the zoom lens in Example 4 of the present invention.
Figures 11E, 11F, 11G, 11H:
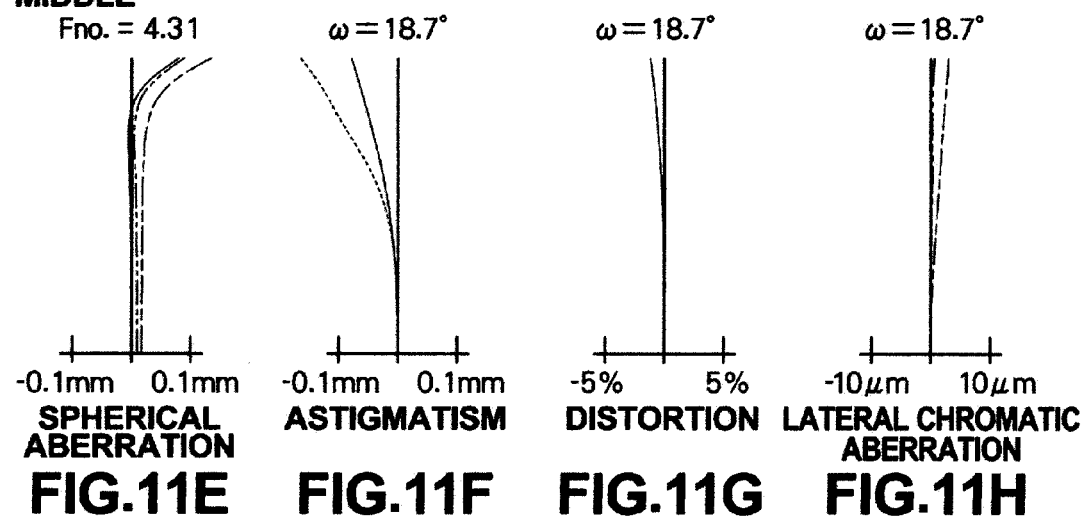
Figures 11I, 11J, 11K, 11L:
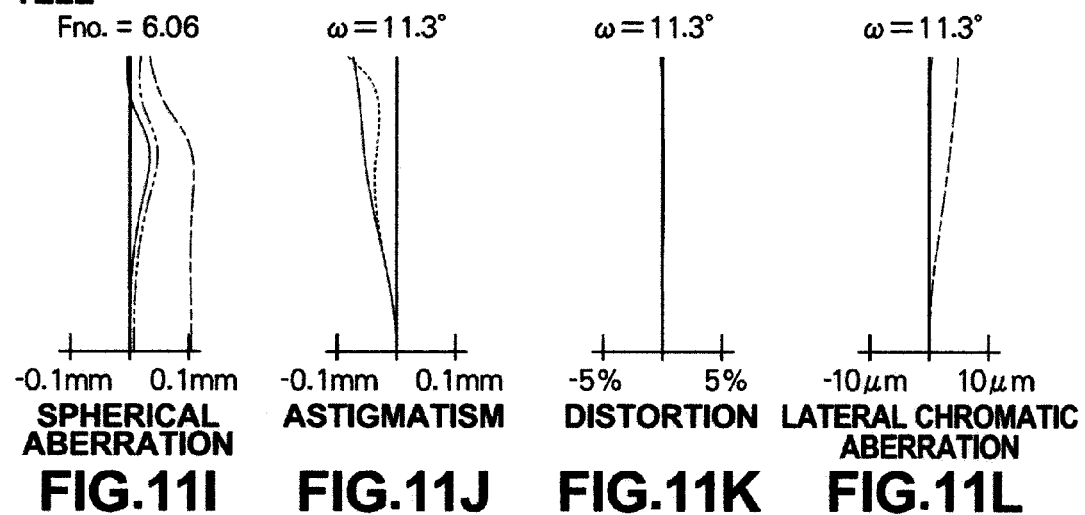

In contrast, FIG. 7C is a diagram illustrating the arrangement of the lens groups when the zoom lens is collapsed by using a method in which only the second lens group G2 is removed from the optical axis Z to be stored. In the method illustrated in FIG. 7C, when the zoom lens is collapsed, only the second lens group G2 is moved in a direction indicated by arrow G2, which is different from the direction of the optical axis Z. Meanwhile, the first lens group G1 and the third lens group G3 are moved in the direction along the optical axis Z, as indicated by arrow G1, G3.

In the method illustrated in FIG. 7C, when the zoom lens is collapsed, the second lens group G2 can be moved, in a direction perpendicular to the optical axis Z, to a position that is parallel to the third lens group G3. Therefore, it is possible to reduce the thickness of the zoom lens in the direction of the optical axis Z when the zoom lens is collapsed. In this method, a part of lenses that is removed from the optical axis Z to be stored is not limited to the second lens group. However, in the zoom lens that is structured as in the embodiment of the present invention, it is desirable that the second lens group G2 is removed from the optical axis Z, considering the thickness of each element in the entire lens system.

Next, examples of numerical values of the zoom lens of the present invention will be described. FIGS. 1 through 5 are cross-sections of the zoom lenses in Examples 1 through 5, respectively.

Table 1 shows lens data about the zoom lens of Example 1, and Table 2 shows aspheric data about the zoom lens of Example 1. Table 3 shows data about zooming variable magnification. Similarly, Tables 4 through 15 show lens data, aspheric data, and zooming variable magnification data about zoom lenses of Examples 2 through 5. In the following descriptions, the meanings of signs in the tables will be explained by using Example 1. The meanings of the signs are basically the same for Examples 2 through 5.

In the lens data of Table 1, column Si shows the surface number of the i-th surface (i=1, 2, 3, . . . ). The most object-side surface of elements constituting the lens system is the first surface, and surface numbers sequentially increase toward the image side. Column Ri shows the curvature radius of the i-th surface, and column Di shows a distance between the i-th surface and the (i+1)th surface, on the optical axis Z. Further, column Ndj shows the refractive index of the j-th lens (j=1, 2, 3, . . .) for d-line (wavelength is 587.6 nm). The most-object side lens is the first lens, and the number j sequentially increases toward the image side. Further, the column vdj shows the Abbe number of the j-th lens for d-line.

The sign (positive/negative) of the curvature radius is positive when the object-side surface is convex, and negative when the image-side surface is convex. The lens data include aperture stop (stop) St and optical member PP. In each of the examples, Ri and Di (i=1, 2, 3, . . . ) in the table of lens data correspond to signs Ri and Di in the cross-section of the lens. Further, the bottom of Table 1 shows the ranges of focal length f (mm), Fno. and full angles 2ω of view (degrees) when the magnification is changed from wide end to tele end.

In the lens data of Table 1, mark "*" is attached to the surface number of an aspheric surface. Further, Table 1 shows, as the curvature radius of the aspheric surface, the numerical value of the curvature radius in the vicinity of the optical axis (paraxial curvature radius). The aspheric data in Table 2 shows aspheric coefficients related to the aspheric surfaces. In the numerical values of aspheric data in Table 2, "E-n" (n: integer) means "×$10^{-n}$", and "E+n" means "×$10^{n}$". Further, the aspheric coefficients are coefficients KA, Am(m=3, 4, 5, . . . ) in the following aspheric equation:

$$Zd = C \cdot h^2 / \{1 + (1 - KA \cdot C^2 \cdot h^2)^{1/2}\} + \Sigma Am \cdot h^m,$$

where

Zd: depth of aspheric surface (the length of a perpendicular from a point on the aspheric surface at height h to a flat plane that contacts with the vertex of the aspheric surface and is perpendicular to the optical axis), h: height (the length from the optical axis to the lens surface), C: paraxial curvature radius, and KA, Am: aspheric coefficients (m=3, 4, 5, . . . ).

In the lens data of Table 1, terms "change d4", "change d10", and "change d12" are written in column Di (distance between surfaces) of distances that are variable when the magnification is changed. The change d4 is a distance between the first lens group G1 and the aperture stop St. The change d10 is a distance between the second lens group G2 and the third lens group G3. The change d12 is a distance between the third lens group G3 and the optical member PP.

Table 3 shows data about zooming variable magnification. Table 3 shows values of the focal length of the entire system, change d4, change d10, and change d12 at wide end, at middle position, and at tele end. Here, degrees are used as the unit of angles in the lens data and the data about zooming variable magnification. Further, "mm" is used as the unit of length. However, since an optical system can achieve similar optical performance when the optical system is proportionally enlarged or reduced, other appropriate units may be used. In the following tables, values are rounded to predetermined digits.

TABLE 1

Example 1: Lens Data

| Si | Ri | Di | Ndj | v dj |
|---|---|---|---|---|
| 1 | ∞ | 0.53 | 1.61400 | 55.0 |
| 2 | 4.3011 | 0.80 | | |
| 3* | 5.4082 | 1.32 | 1.60595 | 27.0 |
| 4* | 10.3733 | CHANGE d4 | | |
| 5(STOP) | ∞ | 0.05 | | |
| 6 | 5.0055 | 1.92 | 1.88300 | 40.8 |
| 7 | −9.3990 | 0.61 | 1.80809 | 22.8 |
| 8 | 9.3990 | 0.17 | | |
| 9* | 16.7287 | 0.86 | 1.50957 | 56.5 |
| 10* | 11.2303 | CHANGE d10 | | |
| 11* | −74.9003 | 1.50 | 1.50957 | 56.5 |
| 12* | −10.5688 | CHANGE d12 | | |
| 13 | ∞ | 0.80 | 1.51680 | 64.2 |
| 14 | ∞ | 0.00 | | |
| 15 (IMAGE PLANE) | ∞ | | | | f=6.86 through 19.40, Fno.=3.24 through 6.07, angle 2ω of view=63.4 through 22.6

TABLE 2

Example 1: Aspheric Data

| Si | KA | A3 | A4 | A5 | A6 |
|---|---|---|---|---|---|
| 3 | −0.9241327 | 1.2807094E−03 | −1.5423134E−03 | 2.4011713E−03 | −1.0779309E−03 |
| 4 | 0.6678306 | 8.8156210E−04 | 2.7500016E−03 | 1.6775362E−03 | 5.8574107E−04 |
| 9 | 1.8238576 | −1.7596800E−03 | 5.9925883E−03 | −2.1425793E−03 | 9.2783910E−04 |
| 10 | 5.0317097 | 1.1610835E−03 | 1.0514528E−02 | 1.4270941E−03 | 1.0647590E−03 |
| 11 | −0.0440454 | 0.0000000E+00 | 1.4130919E−04 | 0.0000000E+00 | 2.2971675E−05 |
| 12 | 3.7939521 | 0.0000000E+00 | 9.9965179E−05 | 0.0000000E+00 | 1.6034172E−05 |

| Si | A7 | A8 | A9 | A10 | A11 |
|---|---|---|---|---|---|
| 3 | 2.2290457E−04 | −4.4355101E−06 | −4.7546329E−06 | 1.3797858E−08 | 6.8072630E−08 |
| 4 | 4.8143606E−05 | 1.1487498E−05 | 1.9796555E−06 | 2.2594993E−07 | 0.0000000E+00 |
| 9 | −1.5400313E−04 | −9.6443741E−06 | −8.9579630E−06 | −5.5182038E−08 | −2.7641324E−08 |
| 10 | 1.5273207E−04 | 3.0166022E−06 | 1.5018531E−06 | 5.1614529E−09 | 1.3603031E−09 |

TABLE 2-continued

Example 1: Aspheric Data

| | | | | | |
|---|---|---|---|---|---|
| 11 | 0.0000000E+00 | 3.2199547E−07 | 0.0000000E+00 | −1.7445138E−08 | 0.0000000E+00 |
| 12 | 0.0000000E+00 | 1.1446845E−06 | 0.0000000E+00 | −4.0490367E−08 | 0.0000000E+00 |

| Si | A12 |
|---|---|
| 9 | −1.3562922E−10 |
| 10 | −5.3943787E−12 |

TABLE 3

Example 1: Data about Zooming Variable Magnification

| | f | CHANGE d4 | CHANGE d10 | CHANGE d12 |
|---|---|---|---|---|
| WIDE | 6.861 | 9.561 | 5.305 | 4.452 |
| MIDDLE | 11.537 | 4.679 | 10.284 | 3.900 |
| TELE | 19.401 | 1.705 | 17.893 | 3.281 |

TABLE 4

Example 2: Lens Data

| Si | Ri | Di | Ndj | νdj |
|---|---|---|---|---|
| 1 | −95.4940 | 0.55 | 1.58313 | 59.4 |
| 2 | 4.4110 | 0.90 | | |
| 3* | 5.6049 | 1.42 | 1.60595 | 27.0 |
| 4* | 9.8473 | CHANGE d4 | | |
| 5(STOP) | ∞ | 0.05 | | |
| 6 | 4.9534 | 1.92 | 1.88300 | 40.8 |
| 7 | −9.2000 | 0.63 | 1.84666 | 23.8 |
| 8 | 9.2000 | 0.19 | | |
| 9* | 14.4098 | 1.00 | 1.50957 | 56.5 |
| 10* | 12.4076 | CHANGE d10 | | |
| 11* | −114.8135 | 1.60 | 1.50957 | 56.5 |
| 12* | −11.2731 | CHANGE d12 | | |
| 13 | ∞ | 0.80 | 1.51680 | 64.2 |
| 14 | ∞ | 0.00 | | |
| 15 (IMAGE PLANE) | ∞ | | | | f=6.80 through 19.22, Fno.=3.17 through 5.95, angle 2ω of view=65.4 through 23.0

TABLE 5

Example 2: Aspheric Data

| Si | KA | A3 | A4 | A5 | A6 |
|---|---|---|---|---|---|
| 3 | −0.4550601 | 2.0655362E−04 | −8.8260982E−04 | 1.5255021E−03 | −6.6914186E−04 |
| 4 | 0.8636347 | 3.2189119E−04 | 1.6662028E−03 | 1.2451069E−03 | 5.0411166E−04 |
| 9 | 0.3933923 | −1.5744424E−03 | 3.4663272E−03 | 1.9551408E−04 | −4.4123043E−05 |
| 10 | 1.8022821 | 8.1776834E−04 | 7.5356771E−03 | 6.6352216E−04 | 6.1640294E−05 |
| 11 | −0.0022064 | 0.0000000E+00 | 1.0895229E−04 | 0.0000000E+00 | 2.2160589E−05 |
| 12 | 2.0627287 | 0.0000000E+00 | −3.0311173E−05 | 0.0000000E+00 | 1.8293286E−05 |

| Si | A7 | A8 | A9 | A10 | A11 |
|---|---|---|---|---|---|
| 3 | 1.2605380E−04 | −2.5880642E−06 | −2.7874664E−06 | 1.2693552E−08 | 5.1615990E−08 |
| 4 | 3.8872635E−05 | 6.9364493E−06 | 8.5086762E−07 | 1.2740069E−07 | 0.0000000E+00 |
| 9 | −7.1546166E−05 | −6.7584691E−07 | −4.4949069E−07 | −2.4044667E−09 | −1.1365728E−09 |
| 10 | 2.3434418E−05 | 6.4608477E−08 | 2.2900911E−08 | 1.0631316E−10 | 5.5775072E−11 |
| 11 | 0.0000000E+00 | −1.1114324E−06 | 0.0000000E+00 | 5.1960802E−08 | 0.0000000E+00 |
| 12 | 0.0000000E+00 | −1.1321520E−06 | 0.0000000E+00 | 5.4923309E−08 | 0.0000000E+00 |

| Si | A12 |
|---|---|
| 9 | −5.1010271E−12 |
| 10 | 3.9874564E−13 |

TABLE 6

Example 2: Data about Zooming Variable Magnification

| | f | CHANGE d4 | CHANGE d10 | CHANGE d12 |
|---|---|---|---|---|
| WIDE | 6.798 | 9.334 | 5.096 | 4.495 |
| MIDDLE | 11.432 | 4.734 | 10.415 | 3.662 |
| TELE | 19.224 | 1.766 | 17.902 | 3.317 |

TABLE 7

Example 3: Lens Data

| Si | Ri | Di | Ndj | νdj |
|---|---|---|---|---|
| 1 | −199.9810 | 0.55 | 1.61405 | 55.0 |
| 2 | 4.3225 | 0.85 | | |
| 3* | 5.5371 | 1.42 | 1.60595 | 27.0 |
| 4* | 10.6494 | CHANGE d4 | | |
| 5(STOP) | ∞ | 0.05 | | |
| 6 | 4.9274 | 2.02 | 1.88300 | 40.8 |
| 7 | −8.7999 | 0.57 | 1.84666 | 23.8 |
| 8 | 9.2618 | 0.19 | | |
| 9* | 25.0790 | 0.90 | 1.50957 | 56.5 |
| 10* | 19.1685 | CHANGE d10 | | |
| 11* | −131.8752 | 1.60 | 1.50957 | 56.5 |
| 12* | −12.2429 | CHANGE d12 | | |
| 13 | ∞ | 0.80 | 1.51680 | 64.2 |
| 14 | ∞ | 0.00 | | |
| 15 (IMAGE PLANE) | ∞ | | | | f=6.81 through 19.25, Fno.=3.21 through 5.97, angle 2ω of view=65.2 through 23.0

TABLE 8

Example 3: Aspheric Data

| Si | KA | A3 | A4 | A5 | A6 |
|---|---|---|---|---|---|
| 3 | −1.5453159 | 1.7517332E−04 | 2.0736977E−04 | 1.3316941E−03 | −5.8032021E−04 |
| 4 | 1.0580439 | 2.7135198E−04 | 1.6162617E−03 | 1.1916315E−03 | 4.7164809E−04 |
| 9 | 2.8054077 | −1.9609270E−03 | 5.5074174E−03 | −1.2281357E−03 | 6.7532076E−04 |
| 10 | 6.5511744 | 1.4349763E−03 | 9.6587771E−03 | 8.2793702E−04 | 8.3712979E−04 |
| 11 | −0.0007366 | 0.0000000E+00 | 2.3855764E−04 | 0.0000000E+00 | −3.2032774E−06 |
| 12 | 1.5392185 | 0.0000000E+00 | 1.7650002E−04 | 0.0000000E+00 | 9.7259906E−06 |

| Si | A7 | A8 | A9 | A10 | A11 |
|---|---|---|---|---|---|
| 3 | 1.0149999E−04 | −1.7986287E−06 | −2.1655099E−06 | 7.5730904E−09 | 3.6801221E−08 |
| 4 | 3.8173645E−05 | 5.6620476E−06 | 9.5010289E−07 | 1.0846333E−07 | 0.0000000E+00 |
| 9 | −1.4262231E−04 | −7.0760816E−06 | −6.4298189E−06 | −3.9190487E−08 | −1.9174284E−08 |
| 10 | 8.3832854E−05 | 2.3626725E−06 | 1.3330333E−06 | 5.2440772E−08 | 1.7114468E−09 |
| 11 | 0.0000000E+00 | 2.6872632E−07 | 0.0000000E+00 | 2.7976574E−08 | 0.0000000E+00 |
| 12 | 0.0000000E+00 | 2.9323889E−07 | 0.0000000E+00 | 3.1896461E−08 | 0.0000000E+00 |

| Si | A12 |
|---|---|
| 9 | −8.5546514E−11 |
| 10 | −2.1562455E−12 |

TABLE 9

Example 3: Data about Zooming Variable Magnification

| | f | CHANGE d4 | CHANGE d10 | CHANGE d12 |
|---|---|---|---|---|
| WIDE | 6.807 | 9.519 | 5.355 | 4.377 |
| MIDDLE | 11.447 | 4.755 | 10.485 | 3.660 |
| TELE | 19.249 | 1.736 | 17.889 | 3.374 |

TABLE 10

Example 4: Lens Data

| Si | Ri | Di | Ndj | νdj |
|---|---|---|---|---|
| 1 | ∞ | 0.53 | 1.61405 | 55.0 |
| 2 | 4.2915 | 0.80 | | |
| 3* | 5.3962 | 1.32 | 1.60595 | 27.0 |
| 4* | 10.2944 | CHANGE d4 | | |
| 5(STOP) | ∞ | 0.05 | | |
| 6 | 5.1374 | 1.90 | 1.88300 | 40.8 |
| 7 | −8.7205 | 0.60 | 1.80809 | 22.8 |
| 8 | 10.5041 | 0.17 | | |
| 9* | 16.9368 | 0.87 | 1.50957 | 56.5 |
| 10* | 10.6102 | CHANGE d10 | | |
| 11* | −57.8572 | 1.50 | 1.50957 | 56.5 |
| 12* | −10.2941 | CHANGE d12 | | |
| 13 | ∞ | 0.80 | 1.51680 | 64.2 |
| 14 | ∞ | 0.00 | | |
| 15 (IMAGE PLANE) | ∞ | | | | f=6.85 through 19.37, Fno.=3.24 through 6.06, angle 2ω of view=63.6 through 22.6

TABLE 11

Example 4: Aspheric Data

| Si | KA | A3 | A4 | A5 | A6 |
|---|---|---|---|---|---|
| 3 | −0.1801441 | 1.2074149E−03 | −2.1809261E−03 | 2.5151340E−03 | −1.1316576E−03 |
| 4 | 0.1810814 | 8.1462919E−04 | 2.8407345E−03 | 1.7068968E−03 | 6.0637771E−04 |
| 9 | 1.7865010 | −1.0760157E−03 | 5.4109223E−03 | −1.9519421E−03 | 9.2786830E−04 |
| 10 | 4.7822759 | 4.9761361E−04 | 9.7654140E−03 | 1.2053480E−03 | 1.0396368E−03 |
| 11 | −0.0400703 | 0.0000000E+00 | 4.5928464E−04 | 0.0000000E+00 | 2.1314431E−06 |
| 12 | 3.1818802 | 0.0000000E+00 | 3.1553236E−04 | 0.0000000E+00 | 4.8198952E−06 |

| Si | A7 | A8 | A9 | A10 | A11 |
|---|---|---|---|---|---|
| 3 | 2.2807192E−04 | −4.1423144E−06 | −4.6032253E−06 | 1.3229461E−08 | 6.6326470E−08 |
| 4 | 4.4041404E−05 | 1.1789618E−05 | 1.5931511E−06 | −2.2340123E−07 | 0.0000000E+00 |
| 9 | −1.6543489E−04 | −9.7868350E−06 | −9.0599646E−06 | −5.5731462E−08 | −2.7885722E−08 |
| 10 | 1.7759092E−04 | 3.1406344E−06 | 1.5472472E−06 | 5.2914488E−09 | 1.3723214E−09 |
| 11 | 0.0000000E+00 | 7.9046152E−07 | 0.0000000E+00 | −1.7132396E−08 | 0.0000000E+00 |
| 12 | 0.0000000E+00 | 1.4077013E−06 | 0.0000000E+00 | −3.4621158E−08 | 0.0000000E+00 |

| Si | A12 |
|---|---|
| 9 | −1.3577598E−10 |
| 10 | −4.7086842E−12 |

TABLE 12

Example 4: Data about Zooming Variable Magnification

|  | f | CHANGE d4 | CHANGE d10 | CHANGE d12 |
|---|---|---|---|---|
| WIDE | 6.850 | 9.562 | 5.398 | 4.443 |
| MIDDLE | 11.519 | 4.663 | 10.335 | 3.917 |
| TELE | 19.370 | 1.704 | 17.970 | 3.235 |

TABLE 13

Example 5: Lens Data

| Si | Ri | Di | Ndj | νdj |
|---|---|---|---|---|
| 1 | −105.2300 | 0.55 | 1.67790 | 55.3 |
| 2 | 4.5685 | 0.85 | | |
| 3* | 5.8195 | 1.40 | 1.61396 | 25.5 |
| 4* | 12.0840 | CHANGE d4 | | |
| 5(STOP) | ∞ | 0.05 | | |
| 6 | 4.9760 | 1.94 | 1.88300 | 40.8 |
| 7 | −8.8824 | 0.71 | 1.80809 | 22.8 |
| 8 | 9.6798 | 0.18 | | |
| 9* | 23.4994 | 0.90 | 1.50957 | 56.5 |
| 10* | 15.2075 | CHANGE d10 | | |
| 11* | −117.6177 | 1.60 | 1.50957 | 56.5 |
| 12* | −11.6256 | CHANGE d12 | | |
| 13 | ∞ | 0.80 | 1.51680 | 64.2 |
| 14 | ∞ | 0.00 | | |
| 15 (IMAGE PLANE) | ∞ | | | | f=6.77 through 19.14, Fno.=3.15 through 5.97, angle 2ω of view=65.4 through 23.0

TABLE 14

Example 5: Aspheric Data

| Si | KA | A3 | A4 | A5 | A6 |
|---|---|---|---|---|---|
| 3 | −1.8372736 | −5.5022454E−04 | 9.5321522E−04 | 9.4301784E−04 | −5.4176749E−04 |
| 4 | 1.4582900 | 1.2187176E−03 | 4.6200692E−04 | 6.3370514E−04 | 4.0095270E−04 |
| 9 | 2.8443685 | −3.3283977E−03 | 6.2365013E−03 | −1.8992039E−03 | 6.9803660E−04 |
| 10 | 7.1502982 | 2.4006811E−03 | 1.0008172E−02 | 1.2802533E−03 | 8.5739257E−04 |
| 11 | −0.0011619 | 0.0000000E+00 | 1.3301170E−04 | 0.0000000E+00 | 1.8551700E−05 |
| 12 | 1.5232059 | 0.0000000E+00 | 1.2578289E−04 | 0.0000000E+00 | 7.8916303E−06 |

| Si | A7 | A8 | A9 | A10 | A11 |
|---|---|---|---|---|---|
| 3 | 1.1158275E−04 | −2.1700406E−06 | −2.6203365E−06 | 4.6915487E−09 | 3.5841555E−08 |
| 4 | 5.3549702E−05 | 5.3065488E−06 | 1.6225628E−06 | 1.1628315E−07 | 0.0000000E+00 |
| 9 | −1.2529671E−04 | −7.0835459E−06 | −6.4992990E−06 | −3.9771201E−08 | −1.9486204E−08 |
| 10 | 8.5797344E−05 | 2.4075875E−06 | 1.3505555E−06 | 5.2658666E−09 | 1.6905813E−09 |
| 11 | 0.0000000E+00 | −7.0024237E−07 | 0.0000000E+00 | 3.7010485E−08 | 0.0000000E+00 |
| 12 | 0.0000000E+00 | −3.0457925E−07 | 0.0000000E+00 | 3.0404665E−08 | 0.0000000E+00 |

| Si | A12 |
|---|---|
| 9 | −8.6482528E−11 |
| 10 | −1.8482772E−12 |

TABLE 15

Example 5: Data about Zooming Variable Magnification

|  | f | CHANGE d4 | CHANGE d10 | CHANGE d12 |
|---|---|---|---|---|
| WIDE | 6.769 | 8.431 | 5.323 | 4.284 |
| MIDDLE | 11.383 | 4.200 | 10.484 | 3.692 |
| TELE | 19.143 | 1.574 | 18.242 | 3.279 |

In all of the zoom lenses of Examples 1 through 5, the material of the second lens L2, the fifth lens L5 and the sixth lens L6 is plastic. Since a half of lenses constituting the entire optical system are plastic lenses, it is possible to produce the zoom lenses at low cost.

Table 16 shows values corresponding to the formulas (1) through (8) in the zoom lenses of Examples 1 through 5. In Examples 1 through 5, d-line is a reference wavelength, and Table 16 shows values at the reference wavelength. As Table 16 shows, all of Examples 1 through 5 satisfy the formulas (1) through (8).

TABLE 16

| FORMULA | EXAMPLE 1 | EXAMPLE 2 | EXAMPLE 3 | EXAMPLE 4 | EXAMPLE 5 |
|---|---|---|---|---|---|
| (1) fG2/fw | 1.320 | 1.319 | 1.319 | 1.320 | 1.269 |
| (2) fG1/fw | −1.738 | −1.690 | −1.682 | −1.730 | −1.560 |
| (3) (DG1 + DG2 + DG3)/fw | 1.12 | 1.21 | 1.19 | 1.12 | 1.20 |
| (4) Nd2 | 1.60595 | 1.60595 | 1.60595 | 1.60595 | 1.61396 |
| (5) vd2 | 27.0 | 27.0 | 27.0 | 27.0 | 25.5 |
| (6) vd1 − vd2 | 28.0 | 32.4 | 28.0 | 28.0 | 29.8 |
| (7) (Nd3 + Nd4)/2 | 1.845545 | 1.86483 | 1.86483 | 1.845545 | 1.845545 |
| (8) vd3 − vd4 | 18.0 | 17.0 | 17.0 | 18.0 | 18.0 |

FIGS. 8A through 8D are diagrams illustrating spherical aberrations, astigmatism, distortion, and lateral chromatic aberrations of the zoom lens of Example 1 at wide end, respectively. FIGS. 8E through 8H diagrams illustrating spherical aberrations, astigmatism, distortion, and lateral chromatic aberrations of the zoom lens of Example 1 at middle position, respectively. FIGS. 8I through 8L are diagrams illustrating spherical aberrations, astigmatism, distortion, and lateral chromatic aberrations of the zoom lens of Example 1 at tele end, respectively.

In the diagrams of spherical aberrations, aberrations for the wavelength of 587.6 nm, the wavelength of 460.0 nm and the wavelength of 615.0 nm are indicated by solid lines, by dot-dash lines, and by two-dot-dash lines, respectively. In the diagrams of astigmatism, aberrations in sigittal direction and aberrations in tangential direction are indicated by solid lines and by broken lines, respectively. In the diagrams of distortion, aberrations for the wavelength of 587.6 nm are indicated by solid lines. In the diagrams of lateral chromatic aberrations, aberrations for the wavelength of 460.0 nm and aberrations for the wavelength of 615.0 nm are indicated by dot-dash lines and by two-dot-dash lines, respectively. In the diagrams of spherical aberrations, "Fno." represents F-number, and in the other diagrams, "ω" represents a half angle of view.

Similarly, FIGS. 9A through 9L, FIGS. 10A through 10L, FIGS. 11A through 11L, and FIGS. 12A through 12L illustrate aberrations of the zoom lenses of Examples 2 through 5, respectively.

As described above, and as data show, each of the zoom lenses of Examples 1 through 5 is composed of a small number of lenses, namely, six lenses. Further, the zoom lenses have zoom ratios of approximately three times, and the cost for producing the zoom lenses is reduced. Further, when the zoom lenses collapse, the thickness in the direction of the optical axis is small. Although the zoom lenses have compact structure, aberrations are corrected in an excellent manner, and the zoom lenses achieve high optical performance.

Figure 13:
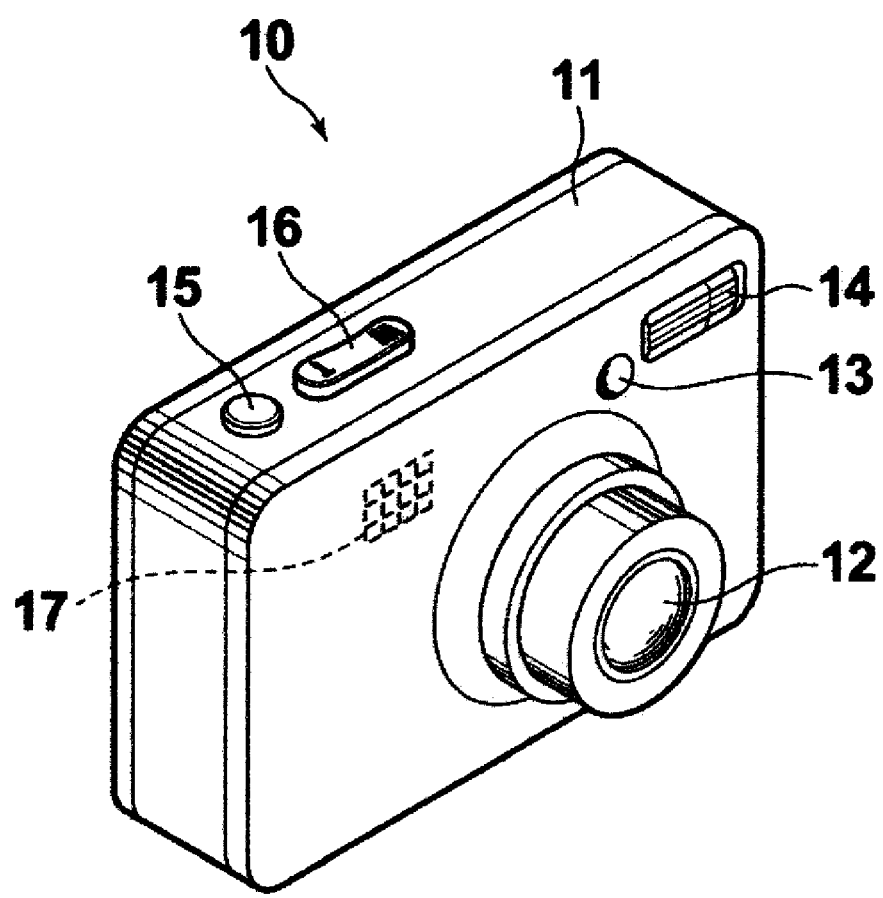
FIG. 13 is a perspective view of a digital camera according to an embodiment of the present invention.

Next, an embodiment of an imaging apparatus according to the present invention will be described. FIG. 13 is a perspective view illustrating a digital camera 10 according to an embodiment of an imaging apparatus of the present invention. As illustrated in FIG. 13, a zoom lens 12 according to an embodiment of the present invention, a finder objective window 13, and a flash-light generation device 14 for outputting flash light to a subject of photography are provided on the front side of a camera body 11 of the digital camera 10. Further, a shutter button 15 and a zoom lever 16 are provided on the upper side of the camera body 11. Further, an imaging device 17, such as a CCD and a CMOS, which images a subject formed by the zoom lens 12 is provided in the camera body 11.

The zoom lens 12 is arranged in such a manner that the direction of the optical axis of the zoom lens 12 is the same as the thickness direction of the camera body 11. As described above, the zoom lens according to an embodiment of the present invention is sufficiently small. Therefore, when the zoom lens 12 collapses into the main body of the camera body 11 to be stored, the entire length of the zoom lens in the direction of the optical axis becomes short. Consequently, the thickness of the digital camera 10 becomes small. Further, since the zoom lens 12 of the present embodiment is producible at low cost, and has high optical performance, the digital camera 10 is producible at low cost, and can obtain high quality images.

So far, the present invention has been described with reference to the embodiments and examples. However, the present invention is not limited to the embodiment and the examples, and various modifications are possible. For example, the curvature radius of each lens element, a distance between surfaces, a refractive index, an Abbe number, and the values of aspheric coefficients are not limited to the values in the examples of numerical values, and they may be other values.

In the embodiment of the imaging apparatus, a case of a digital camera was described as an example. However, the imaging apparatus of the present invention is not limited to the digital camera. For example, the imaging apparatus of the present invention may be applied to a different imaging apparatus, such as a video camera.

The invention claimed is:

1. A zoom lens comprising:
a first lens group having negative refractive power;
a second lens group having positive refractive power; and
a third lens group having positive refractive power, which are sequentially arranged from the object side of the zoom lens,
wherein the focal length magnification of the zoom lens is changeable by changing a distance between the lens groups, and
wherein the first lens group is composed of a first lens having negative refractive power, and the image side of which is concave, and a second lens that is an aspheric plastic lens having positive refractive power, and
wherein the second lens group is composed of a cemented lens and a fifth lens of meniscus form having a convex surface facing the object side, the cemented lens being composed of a third lens of double-convex form having positive refractive power and a fourth lens of double-concave form having negative refractive power, and
wherein the third lens group is composed of a sixth lens having positive refractive power, and which is a single lens, and
wherein the following formula (1) is satisfied:

$$1.10 < fG2/fw < 1.33 \qquad (1),$$

where fG2: the focal length of the second lens group, and
fw: the focal length of the entire system of the zoom lens at wide end.

2. A zoom lens, as defined in claim 1, wherein the following formula (2) is satisfied:

$$-2.0 < fG1/fw < -1.5 \qquad (2),$$

where fG1: the focal length of the first lens group.

3. A zoom lens, as defined in claim 1, wherein the following formula (3) is satisfied:

$$(DG1+DG2+DG3)/fw < 1.3 \qquad (3),$$

where

DG1: distance, on the optical axis of the zoom lens, from the most-object-side surface in the first lens group to the most-image-side surface in the first lens group, DG2: distance, on the optical axis of the zoom lens, from the most-object-side surface in the second lens group to the most-image-side surface in the second lens group, and DG3: distance, on the optical axis of the zoom lens, from the most-object-side surface in the third lens group to the most-image-side surface in the third lens group.

4. A zoom lens, as defined in claim 1, wherein the following formula (4) is satisfied:

$$Nd2 \geqq 1.6 \qquad (4),$$

where

Nd2: the refractive index of the second lens for d-line.

5. A zoom lens, as defined in claim 1, wherein the following formula (5) is satisfied:

$$vd2 < 30.0 \qquad (5),$$

where vd2: the Abbe number of the second lens for d-line.

6. A zoom lens, as defined in claim 1, wherein the following formula (6) is satisfied:

$$26 < vd1 - vd2 < 35 \qquad (6),$$

where vd1: the Abbe number of the first lens for d-line, and
vd2: the Abbe number of the second lens for d-line.

7. A zoom lens, as defined in claim 1, wherein the following formula (7) is satisfied:

$$(Nd3+Nd4)/2 > 1.80 \qquad (7),$$

where

Nd3: the refractive index of the third lens for d-line, and
Nd4: the refractive index of the fourth lens for d-line.

8. A zoom lens, as defined in claim 1, wherein the following formula (8) is satisfied:

$$vd3 - vd4 > 15.0 \qquad (8),$$

where vd3: the Abbe number of the third lens for d-line, and
vd4: the Abbe number of the fourth lens for d-line.

9. A zoom lens, as defined in claim 1, wherein focusing is performed by moving, in the direction of the optical axis of the zoom lens, only the third lens group.

10. An imaging apparatus comprising a zoom lens, as defined in claim 1.

* * * * *